(12) United States Patent
Pan

(10) Patent No.: US 7,406,300 B2
(45) Date of Patent: Jul. 29, 2008

(54) EXTENDING WIRELESS COMMUNICATION RF COVERAGE INSIDE BUILDING

(75) Inventor: Victor Pan, Bedminster, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 616 days.

(21) Appl. No.: 10/901,655

(22) Filed: Jul. 29, 2004

(65) Prior Publication Data

US 2006/0025072 A1     Feb. 2, 2006

(51) Int. Cl.
     *H04B 1/04*      (2006.01)
     *H04B 17/02*     (2006.01)
     *H04B 1/10*      (2006.01)
     *H04B 1/06*      (2006.01)
     *H04B 7/00*      (2006.01)
     *H04L 27/08*     (2006.01)

(52) U.S. Cl. .............. 455/111; 455/127.2; 455/136; 455/138; 455/219; 455/245.1; 455/240.1; 455/232.1; 375/345

(58) Field of Classification Search ............. 455/111, 455/11.1, 13.1, 127.2, 136, 138, 219, 245.1, 455/240.1, 232.1; 375/345
See application file for complete search history.

(56) References Cited

U.S. PATENT DOCUMENTS 6,640,110 B1 * 10/2003 Shapira et al. ............ 455/562.1
6,640,111 B1 * 10/2003 Shapira .................... 455/562.1
6,717,980 B1 * 4/2004 Rishi ........................ 375/219
7,039,410 B2 * 5/2006 Jovanovic ................. 455/444
7,209,703 B1 * 4/2007 Yarkosky ..................... 455/9
2003/0104781 A1 * 6/2003 Son ............................ 455/22
2003/0123401 A1 * 7/2003 Dean ......................... 370/318
2003/0220075 A1 * 11/2003 Baker et al. ................ 455/17
2004/0001464 A1 * 1/2004 Adkins et al. .............. 370/335
2004/0151238 A1 * 8/2004 Masenten .................. 375/219
2006/0205344 A1 * 9/2006 Roper et al. .............. 455/11.1

FOREIGN PATENT DOCUMENTS

EP     1 022 849 A2     7/2000

OTHER PUBLICATIONS

European Search Report for Application No. EP 05 25 4500 mailed Dec. 27, 2005.

* cited by examiner

*Primary Examiner*—Lana N. Le
*Assistant Examiner*—Bobbak Safaipour

(57) ABSTRACT

A wireless communication system includes at least one repeater antenna assembly for providing adequate RF coverage within a building, such as a home. An example repeater antenna assembly has an automatically adjustable gain that is controlled responsive to a pathloss associated with a received signal to avoid base station transceiver desensitization and positive feedback. A disclosed assembly avoids base station desensitization and positive feedback. Another disclosed technique maintains a selected minimum link budget within the building.

22 Claims, 3 Drawing Sheets

EXTENDING WIRELESS COMMUNICATION RF COVERAGE INSIDE BUILDING

FIELD OF THE INVENTION

This invention generally relates to telecommunications. More particularly, this invention relates to wireless communication systems.

DESCRIPTION OF THE RELATED ART

Wireless communication systems have grown in capability and popularity. There are now various wireless service providers that provide voice, data and video communication capabilities to mobile units such as cell phones, personal digital assistants and lap top computers. With the increase in the number of service providers and the increased technological capabilities, wireless communications have become more and more widely used.

One limitation on such communications has been that the ability to obtain an adequate signal within a home, for example, can be too limited to provide confidence for an individual to rely solely upon a mobile unit for all telecommunications from their home. There are a variety of factors contributing to the poor radio frequency (RF) coverage in and around many homes. For example, the metallic content of many home or building structures can provide an RF block or otherwise interfere with adequate signal transmission. In many homes the siding on the exterior of the building, the insulation or window treatments may include metal or foil, which reduces RF coverage within the home. Additionally, the various metal objects and the structure of the internal walls, for example, in many cases prevent adequate interior RF coverage so that an individual cannot rely upon their mobile unit on a consistent basis in all locations within the home.

There is a need for an ability to provide adequate RF coverage within homes or small business buildings, for example, so that mobile units can be consistently used within such structures. Additionally, it may be desirable for some individuals to eliminate their line-based telephone system and high speed Internet access and to rely exclusively on wireless communications.

There are two conventional repeater approaches to providing RF coverage within buildings ("lighting up" buildings). The first approach, which can be referred to as "RF building blasting from the outside in", requires a repeater antenna site such as a rooftop or tower that is frequently prohibitively expensive or not attainable in many residential areas. The repeater captures the outside RF macrocell signal, boosts it, and blasts the boosted signal towards buildings in the hope of overpowering their building penetration losses. Unfortunately, RF building blockage is uneven and the resulting inside RF coverage is unpredictable and often inadequate. There may not be sufficient inside signal levels where needed depending upon where inside the house a call is being made, the house location relative to the serving base station location, building construction, repeater site location, and orientation of the repeater antennas.

The second approach, which employs inside and outside repeater antennas to bypass building penetration losses, uses an outside antenna to capture macrocell RF signals, a coax cable to bypass building penetration losses, a repeater for signal boosting, and one or more inside antennas to create inside RF coverage where desired. The outside antenna, frequently a Yagi, is installed on the house rooftop pointing at the serving macrocell, a long coax cable brings the RF signal inside, a repeater boosts the signal and feeds one or more inside antennas. For homes, small enterprises, and small areas within large buildings such as conference rooms, a low power repeater typically feeds a single inside antenna that may be integrated into the repeater housing. A technician visit is frequently required to install equipment, point the Yagi, install the repeater and inside antenna and set the repeater gains. The need for a technician and the installation of cabling and the external antenna raises costs outside the reach of many homeowners and small enterprise owners.

A significant challenge to a designer of a system to maximize RF coverage into buildings such as homes, for example, is that increasing the amplifier gains generally increases inside RF coverage until either base station receiver desensitization or repeater positive feedback occurs. When either one of these conditions arises, the base station or the repeater can no longer function properly resulting in loss of inside coverage, outside macrocell coverage and traffic capacity or both. Thus, the best possible inside RF coverage occurs when the repeater gains are set to their highest possible settings while avoiding base station receiver desensitization and repeater amplifier positive feedback.

Base station receiver desensitization arises when the repeater injects noise into the radio receiver raising its noise floor. Since the noise level increases within the radio receiver, higher receive signals are required to offset the increase in noise thus causing the "desensitization." This is especially problematic for CDMA systems. If home repeaters were to be used on a widespread basis, there must be some accommodation that prevents base station receiver desensitization.

There is an RF path between repeater amplifier outputs and inputs. The physical path consists of pathloss between repeater antennas connected to the amplifier inputs and outputs and RF multipath. Whenever the repeater gain is set too high, the net path gain from amplifier output to input exceeds unity and the repeater amplifier then oscillates out of control rendering the repeater or base station inoperative. Repeater gains must be limited to avoid both positive feedback and base station receiver desensitization for proper operation of the repeater and the serving base station donor cell.

Repeaters typically include amplifier circuits designed to support multiple wireless CAIs (Common Air Interfaces) such as CDMA IS-95, CDMA 2000, UMTS, GSM, TDMA IS-136 and OFDMA. They currently do not have the ability to automatically set their amplifier gains to the highest possible setting while avoiding base station receiver desensitization and positive feedback. They do not generally exploit characteristics of a particular CAI to automatically set amplifier gains necessary to achieve the best possible inside performance. While some have positive feedback cancellation circuits, they can still oscillate out of control when there is insufficient isolation between repeater antennas. This can occur when the design of the antenna assembly is not integrated with the repeater amplifier circuit design. Others have circuits that automatically step the repeater gains back until positive feedback ceases but do not protect against base station receiver desensitization. Nor do they provide RF signal level thresholds that allow the repeater to only operate when a desired minimum inside link budget can be supported.

This invention goes beyond the current state of the art and provides improved RF coverage extension inside of buildings in an easily installed and economical manner.

SUMMARY OF THE INVENTION

One disclosed example method of communicating includes automatically adjusting a gain of a repeater antenna assembly based upon an estimated loss associated with a signal received at the repeater antenna assembly. In one example, the estimated loss corresponds to the pathloss between the house or building where the repeater antenna assembly is situated and a serving base station. This estimate exploits a common attribute of all CAIs, namely that their received "access and control channel" signal strengths are inversely proportional to this loss. With such an estimate, it is possible to set repeater gains at their highest possible settings while avoiding base station receiver desensitization.

One example assembly integrates several features into a common overall design. One feature is the ability to automatically set repeater gains to the highest possible setting for the best possible inside RF coverage to avoid base station receiver desensitization and positive feedback. This example also has an integrated window mounted antenna assembly design that many home consumers can install without tools and without taking RF measurements. This example also integrates the antenna assembly design with the automatic gain setting circuitry of the repeater amplifiers to avoid positive feedback. Internal circuits of this example permit the repeater to provide at least a minimum desired inside grade of service.

In one example, the repeater antenna assembly includes an outside antenna, an inside antenna, and bi-directional RF amplifiers. A gain associated with the antenna assembly is automatically adjusted to provide the best possible RF coverage within the building structure avoiding base station receiver desensitization and positive feedback. In one example, by maintaining a selected ratio between a loss from the base station to the repeater antenna assembly on the one hand and a gain of the repeater antenna assembly on the other hand provides the best possible RF coverage within the building and keeps the amplifier gain at a level that prevents base station receiver desensitization and avoids positive feedback.

In one example, an uplink gain of the repeater antenna assembly is kept the same as a downlink gain of the assembly. Typically, this balances the inside and outside link budgets as most macrocells are designed for balanced link budgets.

In one example, the power level of the received pilot signal associated with a CDMA/UMTS "access and control channel" is used to adjust the gain of the repeater antenna assembly that allows for finding the highest possible repeater gain while avoiding base station receiver desensitization. In another example, the aggregate received signal power level is used to estimate the loss in CDMA/UMTS systems eliminating the need for pilot demodulating circuitry at diminished loss estimation accuracy. Gain offsets are described to take into account the diminished accuracy. In yet again another example, the technique is applied to GSM and its BCCH access and control channel.

Even with the highest possible repeater gains, there may not be enough signal boost to provide the desired minimum inside RF coverage. One disclosed example repeater antenna assembly includes RF signal level indicators that identify when outside RF signal conditions can support a minimum desired inside link budget. Thus, operators can choose how reliable inside RF coverage should be by setting the RF signal level indicator thresholds. Other RF signal level indicators facilitate finding an optimal spot for the antenna assembly to avoid deep Rayleigh fades.

The various features and advantages of this invention will become apparent to those skilled in the art from the following detailed description. The drawings that accompany the detailed description can be briefly described as follows.

DETAILED DESCRIPTION

Figure 1:
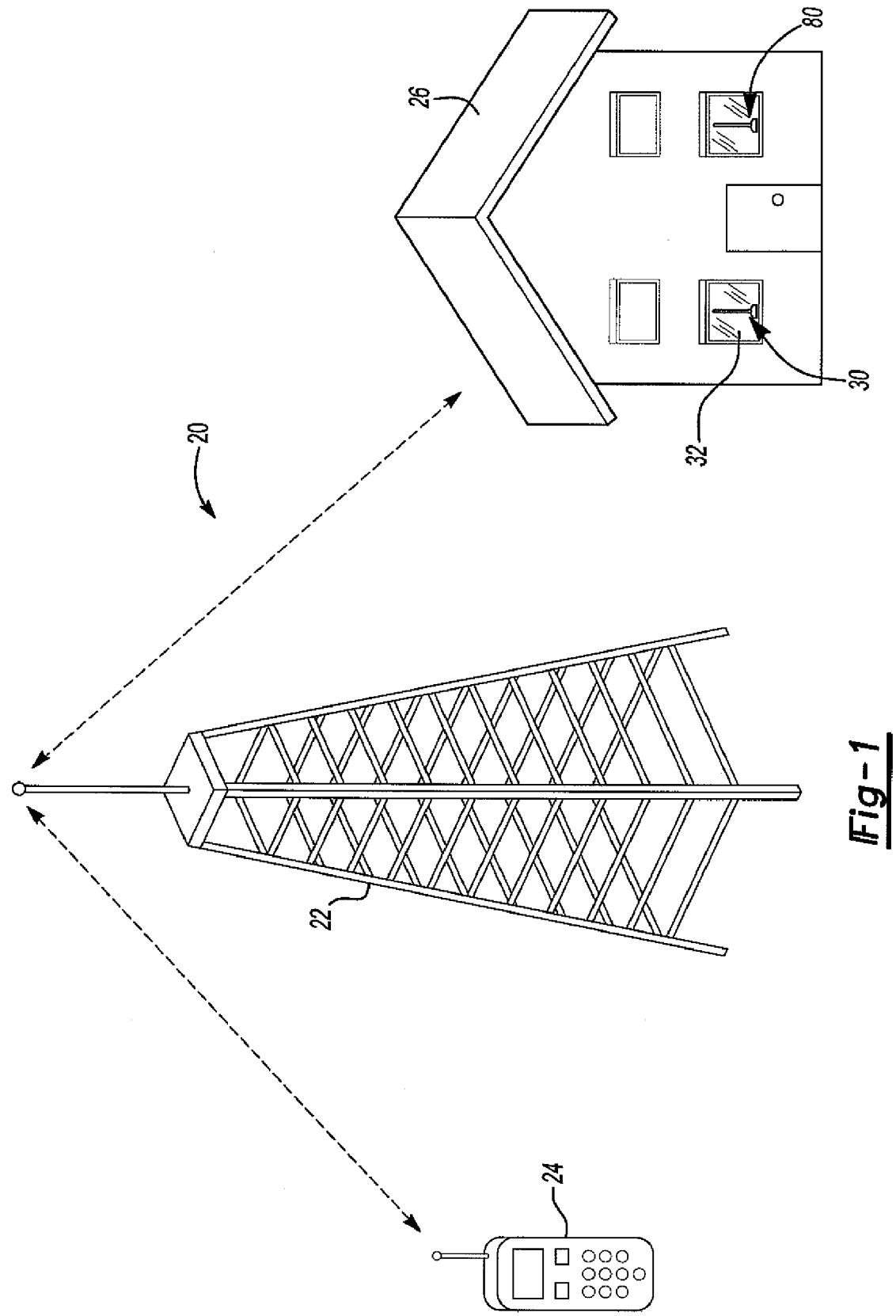
FIG. 1 schematically illustrates selected portions of a wireless communication system that includes an example embodiment of this invention.

FIG. 1 schematically illustrates a wireless communication system 20 showing selected portions of the system. A base station 22 facilitates wireless communication with a plurality of mobile units 24. Such communications occur in a known manner.

The example of FIG. 1 is also well suited for providing wireless radio frequency (RF) signal coverage within a building 26, which may be a home, a small enterprise, or part of an office building, for example. In the illustrated example, a repeater antenna assembly 30 is associated with at least one window 32 of the building 26. The repeater antenna assembly 30 provides at least a minimum desired inside link budget to provide RF coverage within the building 26 based upon signals received from the base station 22. The example repeater antenna assembly 30 is designed to operate at the highest possible gains that avoid positive feedback and base station receiver desensitization.

Base station receiver desensitization does not occur when $G/L < 1/F$ where G is the repeater uplink gain, L is the net loss between the repeater and the base station and F is the noise factor of the repeater amplifier 49 (all in dimensionless units). Avoiding base station receiver desensitization in one example includes estimating the loss L and then setting the repeater gain so that $G = kL/F$ where $k<1$ is an offset parameter that determines how close to operate the repeater amplifier to base station desensitization. The loss L to each repeater antenna assembly is generally different so each repeater will have a custom gain setting.

Wireless CAIs contain a mobile access control channel whose received downlink power is inversely proportional to the net pathloss L between a serving base station and a repeater. For example, downlink pilot signals associated with generic CDMA systems (CDMA IS-95, CDMA 2000, and UMTS) are transmitted at constant power at the base station so the received pilot power is inversely proportional to L. Other examples are GSM with its BCCH channel, TDMA IS-136 with its DCCH channel, and AMPs with its analog control channel. So the method of estimating L depends on the particular CAI's access control channel.

One disclosed method of estimating the net pathloss L includes demodulating the received pilot $P_{rcvpilot}$ (~mw) in a generic CDMA system and measuring its power at the repeater. If $P_0$ (~mw) is the pilot power at the base station (a known base station parameter value), then $L1 = P_0/P_{rcvpilot}$ (~dimensionless) where L1 is the estimate of L based on demodulating the received CDMA pilot. Another disclosed method of estimating the net pathloss L is to use $L2 = k'P_0/P_{rcv}$ where L2 is the estimate of L based on just measuring the aggregate received RF signal (so no pilot demodulating circuits are needed), $P_{rcv}$ (~mw) is the total received power of the downlink carrier at the repeater and k' is an offset parameter with $k'>1$. In the generic example of CDMA, $P_0$ is a known base station configuration parameter frequently chosen as 15% of the maximum downlink base station power (typically 3000 mw) and the additional traffic power can make $P_{rcv}$ up to 8 dB higher. To be within 4 dB (or within a factor of 2.5) of the received pilot power, chose k'=2.5. Thus, L2 is an example of an estimate of the net pathloss for a generic CDMA CAI with an accuracy of 4 dB that does not require a pilot demodulating circuit. The less accurate estimates of L require larger offsets to avoid desensitization. For discussion purposes, the lower cost L2 estimate of L is assumed for a generic CDMA CAI. For GSM, TDMA, or AMPS, estimates of L can be similarly obtained by measuring the received power in their access control channels similar to the expression for L1 for CDMA. For example, for a GSM system, a 200 KHz receiver tuned to the BCCH channel would measure the aggregate power received $P_{rcv}$ and the estimate for L would be $L3=P_{0GSM}/P_{rcv}$ where $P_{0GSM}$ is a known GSM base station power level. Similar expressions can be derived for TDMA, AMPS, and other CAIs.

Figure 2:
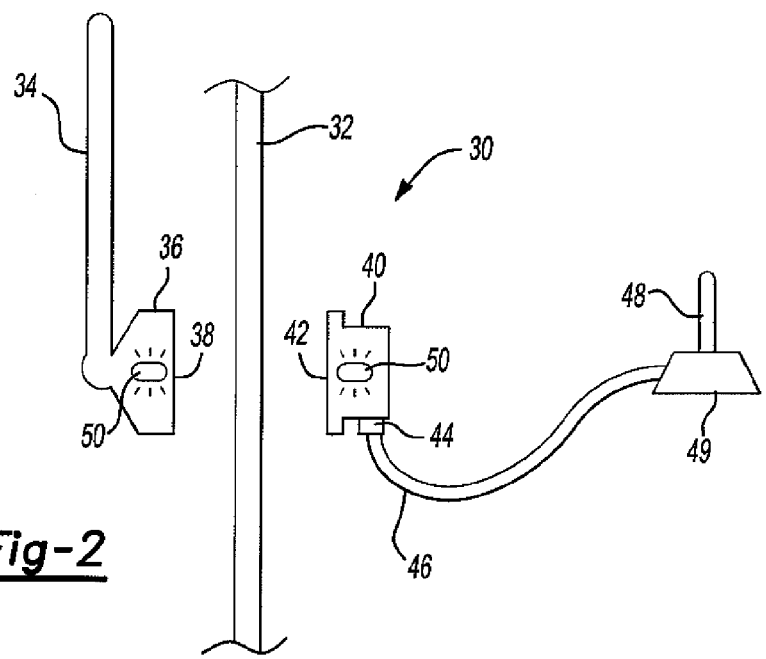
FIG. 2 schematically illustrates an example antenna assembly useful in an embodiment of this invention.
Figure 3:
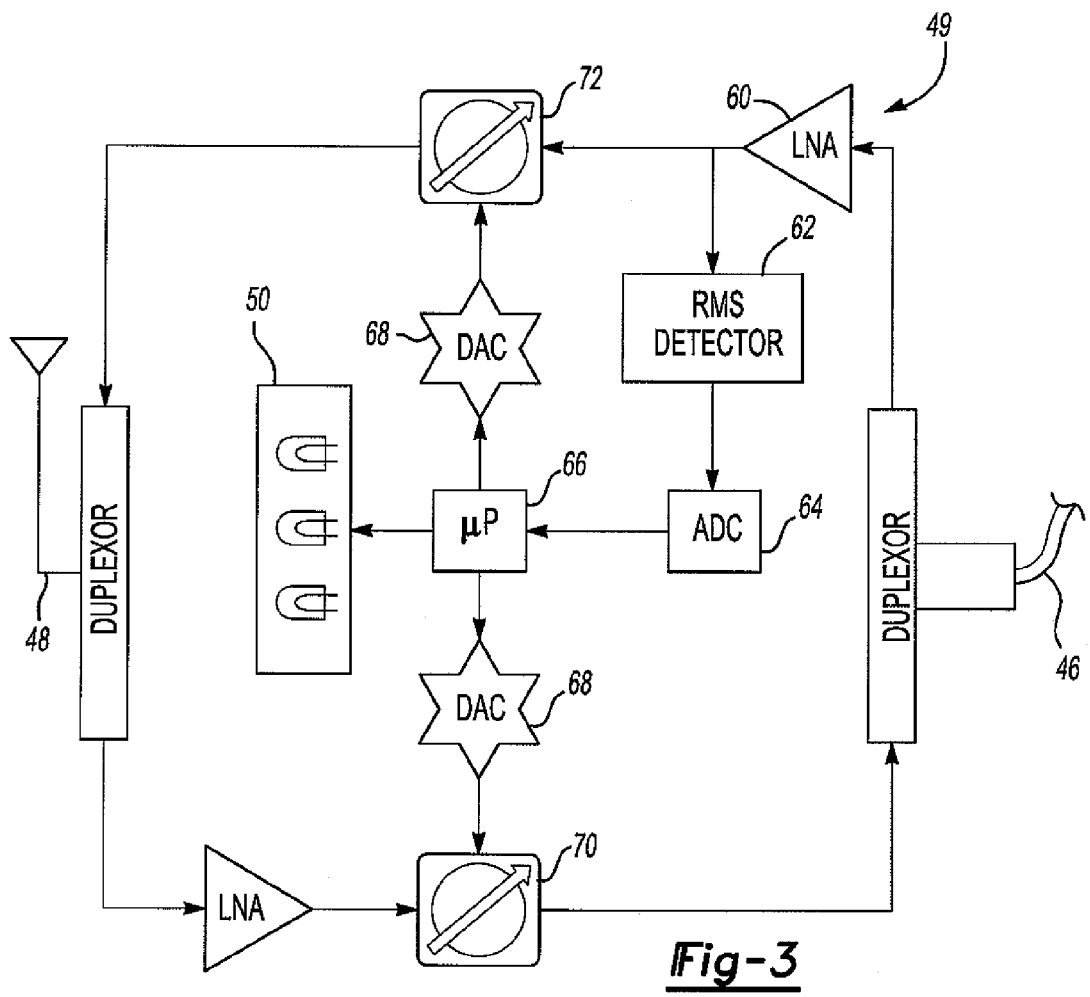
FIG. 3 schematically illustrates an example electronic circuit useful in an embodiment of this invention FIG. 4 graphically illustrates a tradeoff relationship between a desired link budget and loss.

Referring to FIGS. 2 and 3, which includes using the net loss estimate $L2=k'P_0/P_{rcv}$ to automatically set the repeater gains, the aggregate received power $P_{rcv}$ is first boosted by an LNA 60, then integrated to smooth the temporal fading common in RF signals by an RMS detector 62, and then is digitized by an A/D circuit 64. A table lookup within a microprocessor 66 maps $P_{rcv}$ to the downlink repeater gain $G_{down}=k'kP_0/P_{rcv}$ using the estimate for L as L2 and a D/A converter 68 converts the digital signal back to analog. This gain setting is fed to an uplink automatic gain control circuit 70 and a downlink automatic gain control circuit 72. In this example the repeater amplifier gains are set identically. Thus, the repeater gains are set in accordance with G=kL2/F so that base station receiver desensitization will not occur with sufficient offset k to compensate for the inaccuracy of the estimate of L. For an example CDMA embodiment, k is less than 1/2.5 to avoid desensitization. Other CAI embodiments can automatically set the repeater gains based on other estimates of L with appropriate accuracy offsets. These other embodiments rely on measuring the CAI access and control channel to estimate L as previously described. There are commercially available low cost chips that perform such D/A, A/D and table look up functions as depicted by the ADC 64, DAC 68, and microprocessor 66 in the example of FIG. 3.

Figure 5:
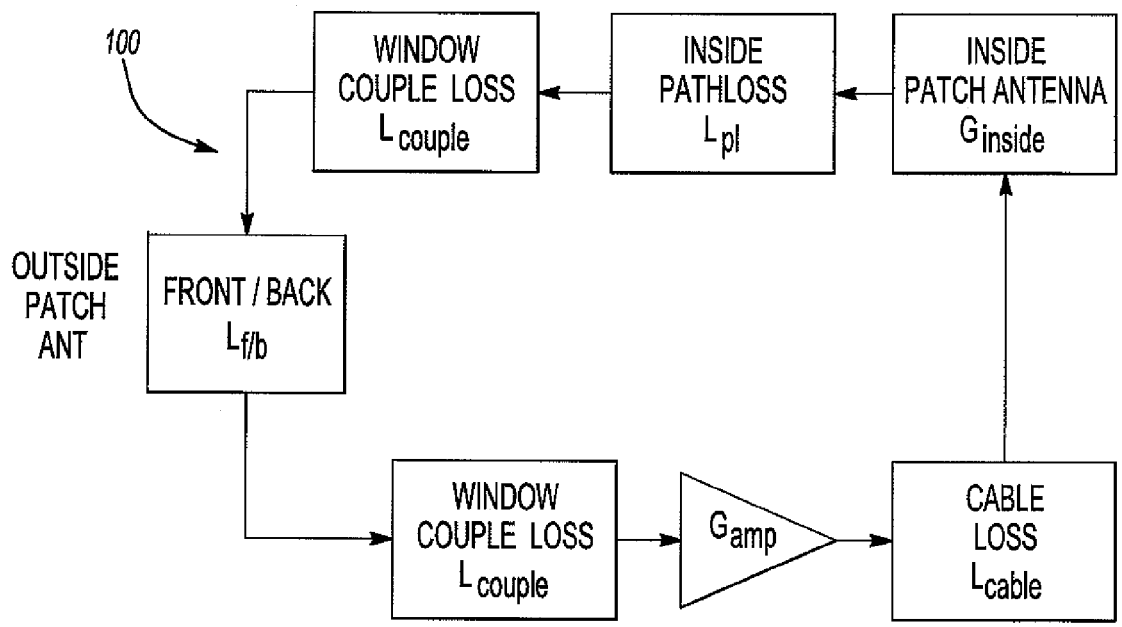
FIG. 5 schematically depicts a positive feedback path.

To avoid positive feedback, the lookup table is populated only with repeater gains less than those that cause positive feedback. This integrates the antenna assembly design into the automatic repeater gain circuitry. The positive feedback gain values depend upon the design of the antenna assembly. FIG. 2 illustrates an example antenna assembly embodiment and FIG. 5 schematically illustrates the positive feedback path gain calculation 100. In the illustrated example, representative component RF specifications of the antenna assembly include: a lambda wavelength is 0.352941 meters, the coupling loss across the window 32 is 3 dB, the loss associated with the connecting cable 46 is 3 dB, the inside antenna gain is 6 dBi and the front-to-back ratio of the outside patch antenna is 25 dB. Table 1 below summarizes the maximum positive feedback repeater gains for three different operating frequencies and three different integrated antenna designs involving antenna separations of 1, 2, and 3 meters based on calculations contained below.

FIG. 2 schematically shows one example window mount antenna assembly 30. In this example, an outside antenna 34 is supported on a base 36. A mounting surface 38 of the base 36 allows the base 36 to be secured to an outside surface of a window 32, for example. In one example, a hook and loop fastener arrangement is adhesively secured to the window and the mounting surface 38 is configured to be appropriately secured with the hook and loop fastener. In another example, the mounting surface 38 includes an adhesive that is secured directly to a window surface. A variety of mounting strategies may be utilized and those skilled in the art who have the benefit of this description will be able to select an appropriate mounting arrangement to meet the needs of their particular situation.

The example window repeater antenna assembly 30 includes an RF coupler 40 that is adapted to be supported on an oppositely facing inside of the window on which the mounting surface 38 is secured. In this example, the RF coupler 40 includes a mounting surface 42 that can be secured to a window in a known manner, such as adhesively.

In one example, the base 36 and the RF coupler 40 are secured on opposite sides of a window 32 in a "sandwich" configuration such that the base 36 and the RF coupler 40 are directly aligned with each other on opposite sides of the window. In such an arrangement, the glass or composite material of the window introduces some loss between the antenna 34 and RF coupler 40. In one example, the window material and coupler introduces a 3 dB coupling loss. The RF coupler 40 effectively picks up the RF signal detected by the antenna 34 outside of the building in a known manner.

The example RF coupler 40 has a cable connection 44 with a cable 46, which is connected to a bi-directional RF amplifier 49 which also serves as a physical base for the inside antenna 48. Various locations within the building can be selected for the inside antenna 48. In one example, a base 49 of the inside antenna 48 allows the inside antenna 48 to be conveniently located on a shelf, table or mounted on an interior wall, for example. The cable 46 provides a direct connection between the RF coupler 40 and the bi-directional amplifier 49 and the inside antenna 48 and allows for adequate physical spacing between them to avoid positive feedback.

There are a number of sources contributing to positive feedback. For example, the front to back ratio of the outside antenna 34, the RF coupler 40 loss, the pathloss between the inside antenna 48 and the back of the outside antenna 34, the gain of the inside antenna 48, the cable loss 46, and the amplifier gain of the assembly 49, all may contribute to positive feedback. These example factors can be combined for determining whether positive feedback exists, given a set of RF component specifications. One example positive feedback path gain (PG) is schematically shown in FIG. 5 and can be expressed by the following equation:

$$PG = -L_{cable} + G_{inside} - L_{p1} - L_{couple} - L_{feedback} - L_{couple} + G_{amp}$$

Provided that the path gain is less than 0 dB, there will be no positive feedback. By limiting the gain $G_{amp}$ of the amplifier of the repeater antenna assembly 49 and setting a minimum distance between the antennas 34 and 48, the value of PG can be kept below 0 dB to avoid positive feedback. In one example, the gain $G_{p1}$ of the path loss corresponding to the path loss $L_{p1}$ can be expressed as follows:

$$G_{p1} = 10 \log(\lambda^2/(4\pi R)^2) \text{dB},$$

where

R is the distance between the outside antenna 34 and the inside antenna 48; and

λ is the wavelength of the operating frequency in meters.

In one example, provided that the distance R between the antennas is kept at least one meter and the amplifier gain is kept at or below 60 dB, there will be no positive feedback. In the discussed example, keeping the downlink gain below 60 dB avoids positive feedback so the look up table in the microprocessor 66 would be populated with gains less than 60 dB. In one example, the uplink gain is set to be equal to the downlink gain.

Other separation distances between the antennas may be useful, depending on the system configuration and operating parameters such as operating frequency. Table 1 contains several other examples operating at 850 MHz, 1.9 GHz and 2.1 GHz, respectively based on the example component RF specifications shown in FIG. 5. These results are conservative as the path gain calculation assumes the worse case of the inside antenna facing the back of the outside antenna. In practice, these antennas will generally be facing away from each other.

TABLE 1

| Ant Separation R meters | Positive Feedback Gains~dB | | |
|---|---|---|---|
| | Frequency | | |
| | 850 MHz | 1.9 GHz | 2.1 GHz |
| 1 | 59 | 66 | 67 |
| 2 | 65 | 72 | 73 |
| 3 | 68 | 75 | 76 |

In one example, the outside antenna 34 and the inside antenna 48 are directional antennas. The use of a directional outside antenna 34 reduces the pathloss to the serving macrocell and reduces RF interference from other macrocells. Thus, more homes can be covered and higher wireless data rates are achievable with directional outside antennas. The use of a directional inside antenna 48 pointed inside directs most of the signal into the building 26 for greater RF efficiency. The use of two directional antennas decreases the effective RF coupling between them, so higher repeater gains can be used without positive feedback. These are some of the key antenna design considerations in integrating the antenna design with the automatic gain circuitry. In one example, at least the inside antenna 48 ground plane produces 90° directional with 6 dBi boresight gain and a 25 dB front-to-back ratio. In some examples, the operating frequency and the physical separation between the outside antenna 34 and the inside antenna 48 is sufficient for achieving RF amplifier gains up to approximately 60-76 dB in both directions as can be appreciated from Table 1, for example.

The example integrated window antenna is designed to be installable by the average home consumer to avoid a costly technician visit. One significant advantage of the example repeater antenna assembly 30 is that it can be easily and conveniently installed on a window of a building without requiring modification to the building structure, without requiring any change to the wiring within the building, or without requiring special tools.

Another feature of the disclosed example repeater antenna assembly 30 is that it provides a visual indication such as a lit LED 50 (as illustrated in FIG. 3) to an individual when a strong enough outside RF signal is available so that so that a minimum desired level of inside pathloss can always be supported. This eliminates the need for a technician to take RF measurements. The internal repeater circuitry allows the repeater to function only when this LED lights up. This provides the Wireless Service Provider the ability to always provide a minimum inside grade of RF coverage service. This feature prevents customer complaints by allowing the Wireless Service Provider to choose a minimum desired inside link budget.

Rayleigh fading further complicates the positioning of the outside antenna 34. As is well known, moving the outside antenna just a few inches can produce deep signal fades of 20-25 dB. These deep fades can dramatically reduce the inside link budget or may render the repeater antenna assembly 30 not useable at a particular house. By providing additional visual indications of received RF signal strength, (i.e., a plurality of sequentially lit LEDs to signify stronger received RF signals) it will be possible for the home consumer to find the antenna positions out of Rayleigh fades so that minimum or better than minimum inside link budget is supported.

The geographic position of the home or small enterprise might be such that the desired minimum inside link budget cannot be supported because of insufficient received outside RF signal. When this happens, no LED 50 lights up and the repeater does not operate. Where homes are physically positioned such that there is a "residual" or leftover macrocell link budget R, an inside mobile can transmit at a power level R dB hotter than if it were positioned where the outside antenna 34 is positioned. That residual supplements the repeater gain in providing the inside link budget.

Generally, homes physically positioned closer to the serving macrocell have greater residual link budget than those positioned further away. Thus, homes positioned closer generally have better inside coverage. They also have stronger "access and control channel" signal strengths outside and so the threshold value at which a first LED 50 lights up determines how much residual and how much inside link budget is supported. So the LED threshold value determines the minimum desired inside link budget.

The LED threshold value depends on a link budget methodology that trades off the desired minimum inside link budget for maximum allowable repeater gain, and available link budget residual. The desired minimum inside link budget value is a service provider policy choice. The maximum allowable repeater gain depends on antenna assembly design and operating frequency as described earlier. The available link budget residual depends on the position of the house with respect to the position of the serving base station. The details of the link budget methodology depend upon the treatment of noise and interference specific to a particular CAI. Those skilled in the art will know how to insert the relevant details for their particular CAI and antenna assembly from this generic description.

The most intuitive definition of link budget "residual" R is the difference between the maximum and actual transmit mobile power (in dB) when the mobile is positioned exactly where the outside antenna is placed. With a balanced donor cell link budget, the residual can also be mathematically expressed as $$R = M - \mathcal{E} \sim dB$$

where

R is the residual as intuitively defined ~dB

M is the donor macrocell link budget specific to a CAI exclusive of building or vehicular penetration losses ~dB, antenna gains are in ~dBi $\mathcal{E}$ is the loss between the base station amplifier output and the spot outside the window where the outside repeater antenna is placed ~dB.

Notice $\mathcal{E}$ is defined slightly differently than L. More rigorously, L is defined as the loss between the serving base station amplifier output and input to the downlink repeater amplifier. $\mathcal{E}$ and L are related by $$L = \mathcal{E} - Ant_{outside} + C1 \sim dB$$

where
C1 is the cable and RF coupling loss from the outside antenna terminals to the input to the downlink repeater amplifier ~dB
$Ant_{outside}$=gain of the outside repeater antenna ~dBi Therefore, the residual R referenced at the input to the downlink repeater amplifier is given by $$R'=R+Ant_{outside}-C1 \text{ ~dB}$$

where
R' is the residual referenced at the input to the downlink repeater amplifier ~dB
The inside link budget $LB_{inside}$ is given by $$LB_{inside}=R'+G+Ant_{inside} \text{ ~dB}$$

where
$LB_{inside}$ is the inside link budget or inside pathloss ~dB
G is the automatically set gain of the repeater amplifiers ~dB
$Ant_{inside}$ is the gain of the inside antenna ~dBi
The inside link budget $LB_{inside}$ can be expressed in terms of the intuitive residual R $$LB_{inside}=R+G+Ant_{inside}+Ant_{outside}-C1 \text{ ~dB for the set L}$$

for which $G<G_{fb}$ and $$LB_{inside}=R+G_{fb}+Ant_{inside}+Ant_{outside}-C1 \text{ ~dB otherwise}$$

where
R and G are monotonic functions of L ~dB
$G_{fb}$ ~dB is the maximum gain entered into the lookup table to avoid positive feedback and is dependent upon the antenna assembly design Recall, the repeater gains are automatically set based on an estimate of L such that $G<G_{fb}$ to avoid positive feedback as $$G=L-\sigma+K \text{ for all L such that } G<G_{fb} \text{ ~dB}$$

$$G=G_{fb} \text{ ~dB otherwise}$$

where
G is the automatically set uplink and downlink repeater gains ~dB
$\sigma$ is the noise figure of the repeater amplifiers ~dB, $\sigma=10\log(F)$
$K=10\log(k)$, $k<1$ is the offset parameter defined earlier to take into account of the accuracy of estimating L.
For $G<G_{fb}$, $$L=G+\sigma-K \text{ or}$$

$$\ell=G+\sigma-K+Ant_{outside}-C1$$

$$M-R=G+\sigma-K+Ant_{outside}-C1$$

$$R=M-G-\sigma+K-Ant_{outside}+C1 \text{ ~dB}$$

So that the inside link budget becomes $$LB_{inside}=M-\sigma+K+Ant_{inside} \text{ ~dB}, G<G_{fb}$$

For $G=G_{fb}$, choose a desired minimum inside link budget $D_{inside}$ ~dB. Then the residual must satisfy $$R>D_{inside}-G_{fb}-Ant_{inside}-Ant_{outside}+C1 \text{ ~dB}$$

Houses must be positioned within the serving donor macrocell with pathloss $\ell$ ~dB to achieve the minimum desired inside link budget:

$$\ell<M-D_{inside}+G_{fb}+Ant_{inside}+Ant_{outside}-C1 \text{ ~dB}$$

The largest value $\ell$, $\ell_{max}$, is given by $$\ell_{max}=M-D_{inside}+G_{fb}+Ant_{inside}+Ant_{outside}-C1 \text{ ~dB}$$

Figure 4:
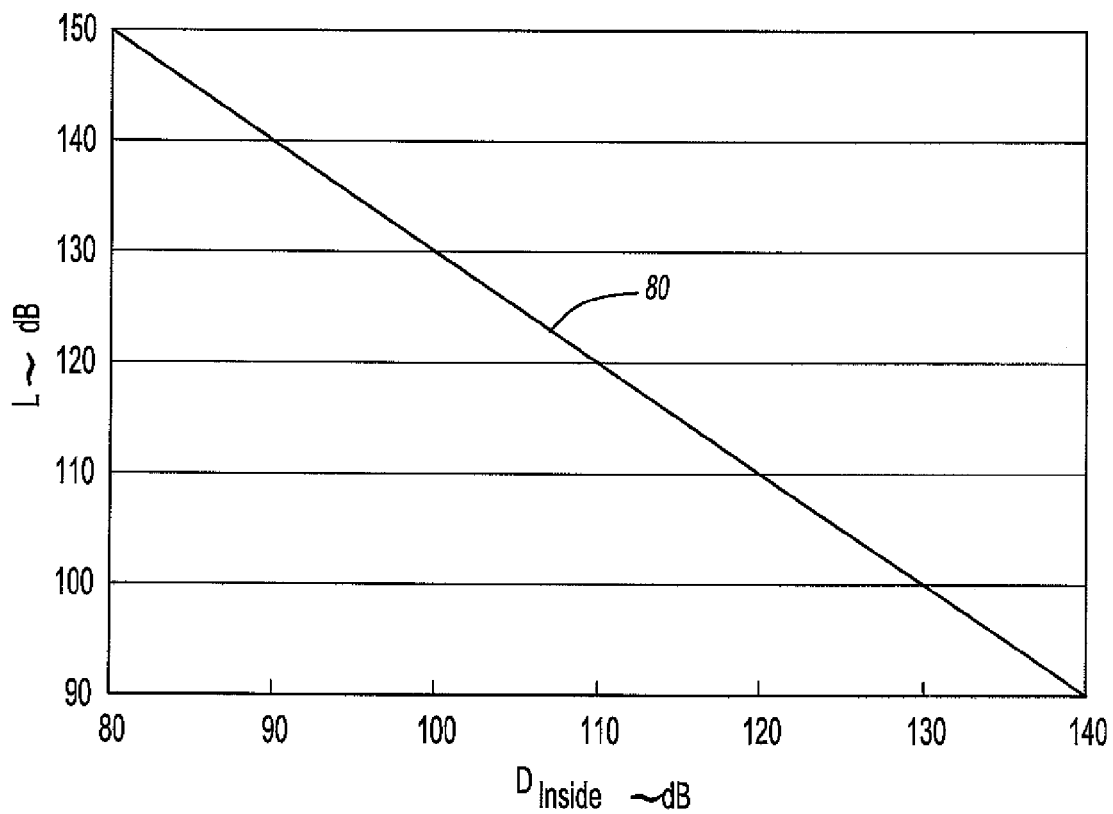

FIG. 4 shows an illustrative tradeoff between the desired inside link budget $D_{inside}$ versus the maximum loss $\ell_{max}$ for the following parameter values:
M=154 dB=a macrocell link budget exclusive of building or vehicular penetration losses
$G_{fb}$=70 dB as supported by the antenna assembly design as illustrated by one of the embodiments in Table 1
$Ant_{inside}+Ant_{outside}-C1$=6 dB FIG. 4 includes a plot 80 that shows how the greater the desired inside link budget, the less maximum loss $\ell$ there can be to the served home or small enterprise from the serving donor macrocell. This means the fewer homes that are covered by repeaters, the greater the minimum desired inside link budget. The exact tradeoff will depend upon the particular CAI link budget, operating frequency, and antenna assembly used.

The minimum RF signal strength indicator, such as the LED's 50, is triggered at the received RF signal levels corresponding to the maximum loss $\ell_{max}$. The triggering level depends upon the CAI and antenna assembly design. For the generic CDMA CAI embodiment using the L1 estimate for loss L, $$L=P_0-P_{rcvpilot} \text{ ~dB}$$

where
$P_0$ is the pilot power transmitted at the base station ~dBm
$P_{rcvpilot}$ is the received pilot power at the input to the repeater ~dBm Since $L=\ell-Ant_{outside}+C1$ ~dB, at the maximum loss $\ell_{max}$, the weakest LED RF signal strength indicator is adjusted to indicate minimum RF signal power of $$P_{rcvpilotmin}=P_0-\ell_{max}+Ant_{outside}-C1 \text{ ~dBm or}$$

$$P_{rcvpilotmin}=P_0-M+D_{inside}-G_{fb}-Ant_{inside}-C1 \text{ ~dBm}$$

where
$P_{rcvpilotmin}$=minimum RF signal indicator threshold ~dBm
$D_{inside}$=minimum desired inside link budget ~dB
$G_{fb}$=maximum gain in the lookup table to prevent positive feedback ~dB The additional RF signal strength indicators would be set at 5 to 10 dB steps higher to allow antenna positioning to avoid the Rayleigh fades.

For the generic CDMA CAI embodiment using the L2 estimate for loss L, $$L=P_0-P_{rcv}-10\log(k') \text{ ~dB}$$

where
$P_0$ is the pilot power transmitted at the base station ~dBm
$P_{rcv}$ is the aggregate received power at the input to the repeater ~dBm
k' is the offset parameter k'>1 defined in the definition of L2 ~dimensionless Since $L=\ell-Ant_{outside}+C1$ ~dB, at the maximum loss $\ell_{max}$, the weakest LED indicator is adjusted to indicate minimum RF signal power of $$P_{rcvmin}=P_0-10\log(k')-\ell_{max}+Ant_{outside}-C1 \text{ ~dBm or}$$

$$P_{rcvmin}=P_0-10\log(k')-M+D_{inside}-G_{fb}-Ant_{inside} \text{ ~dBm}$$

where
$P_{rcvmin}$=minimum RF signal indicator threshold ~dBm $D_{inside}$=minimum desired inside link budget ~dB
$G_{fb}$=maximum gain in the lookup table to prevent positive feedback ~dB Similar other LED thresholds can be calculated for other estimates of L and other CAI embodiments.

Returning to FIG. 1, a second repeater antenna assembly 80 is associated with the building 26. In this example, one repeater antenna assembly is tuned to a frequency dedicated to voice communication while the other repeater antenna assembly is turned to a frequency dedicated to data communications. In this example, wireless can be used for voice (i.e., POTS) communication and for Internet service to replace a line-based DSL connection, for example. The repeater can be tuned to support single or multiple carriers supporting voice only, data only or voice and data combined. For example, the repeater can be tuned to support CDMA IS-95, CDMA 1X, CDMA DO, CDMA DV, UMTS, HSDPA, GSM, GPRS, EDGE and OFDMA.

Depending on the different types of communication for which a mobile unit would be used relying upon adequate RF coverage within the building 26, an appropriate number of repeater antenna assemblies may be selected. Given the gain adjustment and link budget balancing techniques disclosed above, having multiple repeater antenna assemblies designed according to an embodiment of this invention does not pose a risk of positive feedback or base station receiver desensitization.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A method of communicating using a repeater antenna assembly, comprising:
   automatically adjusting a gain of the repeater antenna assembly based upon a pathloss associated with the repeater antenna assembly; and
   automatically setting the gain to no more than a highest possible gain that avoids base station desensitization, wherein setting the gain comprises keeping a ratio of the gain to a net pathloss between the repeater antenna assembly and the base station less than an inverse of a noise factor of the repeater antenna assembly.

2. The method of claim 1, comprising:
   automatically estimating the pathloss; and
   automatically adjusting the gain to satisfy a desired ratio of the gain to the estimated loss.

3. The method of claim 1, comprising:
   determining a strength of a signal received by the repeater antenna assembly;
   determining the estimated loss based upon the determined strength.

4. The method of claim 3, comprising determining the strength based upon a selected channel of the received signal.

5. The method of claim 1, comprising:
   determining a strength of a signal received by the repeater antenna assembly; and
   providing an indication if the determined strength exceeds a threshold that corresponds to a minimum desired link budget.

6. The method of claim 5, comprising adjusting the indication based on the determined strength.

7. The method of claim 5, comprising providing a visual indication.

8. The method of claim 1, comprising:
   assigning a first repeater antenna assembly to a first frequency that is dedicated to at least one of data or voice communication; and
   assigning a second repeater antenna assembly to a second frequency that is dedicated to at least the other of data or voice communication.

9. The method of claim 1, comprising setting the gain at a maximum that corresponds to a stable repeater antenna assembly.

10. The method of claim 9, wherein the stable repeater antenna assembly comprises an inside antenna and an outside antenna and the method comprises setting the gain and a distance between the antennas such that there is no positive feedback associated with the antennas.

11. The method of claim 1, comprising setting a downlink gain equal to an uplink gain.

12. The method of claim 1, comprising setting the gain to maintain a minimum link budget associated with the repeater antenna assembly.

13. A repeater antenna assembly, comprising:
    a first antenna;
    a second antenna;
    a coupler for coupling the first and second antennas, the coupler having an automated gain adjustor that automatically adjusts a gain of the assembly responsive to a pathloss associated with the first antenna, the automated gain adjuster adjusting the gain of the assembly to no more than a highest possible gain that avoids base station desensitization, wherein the automated gain adjuster automatically sets the gain to no more than the highest possible gain that avoids base station desensitization by keeping a ratio of the gain of the assembly to a net pathloss between the assembly and the base station less than an inverse of a noise factor of the assembly.

14. The assembly of claim 13, wherein the automated gain adjustor uses a strength of a signal received by the first antenna as an indication of the pathloss and comprising an indicator for providing an indication of the signal strength.

15. The assembly of claim 14, wherein the indicator comprises a visible indicator that provides a visible indication corresponding to the signal strength.

16. The assembly of claim 13, wherein the automated gain adjustor sets an uplink gain of the amplifier approximately equal to a downlink gain of the amplifier.

17. The assembly of claim 13, wherein the automated gain adjustor adjusts the gain to maintain a selected minimum link budget associated with the assembly.

18. The assembly of claim 13, comprising a mounting base supporting the first antenna, the mounting base being adapted to be secured in a selected position on one side of a window, wherein the coupler is adapted to be secured in a corresponding position on an opposite side of the window and comprising a cable connection between the coupler and the second antenna.

19. The assembly of claim 18, wherein at least the second antenna comprises a directional antenna.

20. The assembly of claim 13, comprising a repeater amplifier and wherein the noise factor is a noise factor of the repeater amplifier.

21. The method of claim 1, wherein the repeater antenna assembly includes a repeater amplifier and the noise factor is a noise factor of the repeater amplifier.

22. The method of claim 1, comprising
    setting the gain such that $G=kL/F$, where G is the gain, L is the pathloss, F is the noise factor of the repeater antenna assembly and k is an offset parameter having a value that is less than one.

* * * * *

UNITED STATES PATENT AND TRADEMARK OFFICE
CERTIFICATE OF CORRECTION

| | |
|---|---|
| PATENT NO. | : 7,406,300 B2 |
| APPLICATION NO. | : 10/901655 |
| DATED | : July 29, 2008 |
| INVENTOR(S) | : Vic Pan, Walter Honcharenko and Gregg Nardozza |

It is certified that error appears in the above-identified patent and that said Letters Patent is hereby corrected as shown below:

Title Page, Item (75) Inventors should read:
--(75) Inventor:  Vic Pan, Bedminster, NJ (US)
   Walter Honcharenko, NJ (US)
   Gregg Nardozza, NJ (US)--.

Signed and Sealed this

Eighteenth Day of May, 2010

David J. Kappos
*Director of the United States Patent and Trademark Office*